(12) United States Patent
Sato et al.

(10) Patent No.: US 9,277,474 B2
(45) Date of Patent: Mar. 1, 2016

(54) WIRELESS COMMUNICATION SYSTEM, MOBILE STATION, BASE STATION, AND COMMUNICATION METHOD

(71) Applicant: FUJITSU LIMITED, Kawasaki-shi, Kanagawa (JP)

(72) Inventors: Tomonori Sato, Kawasaki (JP); Naoyuki Saito, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 144 days.

(21) Appl. No.: 14/150,311

(22) Filed: Jan. 8, 2014

(65) Prior Publication Data
US 2014/0126546 A1   May 8, 2014

Related U.S. Application Data

(63) Continuation of application No. PCT/JP2011/069427, filed on Aug. 29, 2011.

(51) Int. Cl.
*H04W 36/30* (2009.01)
*H04W 72/04* (2009.01)
(Continued)

(52) U.S. Cl.
CPC ............ *H04W 36/30* (2013.01); *H04W 48/20* (2013.01); *H04W 72/0426* (2013.01); *H04W 92/20* (2013.01)

(58) Field of Classification Search
CPC ..... H04W 36/04; H04W 36/16; H04W 72/00; H04W 72/02; H04W 72/04; H04W 72/0413; H04W 72/0426; H04W 72/042; H04W 72/0453; H04W 72/082; H04W 72/085; H04W 36/0072; H04W 36/0055; H04W 36/30; H04W 36/08; H04W 36/0061
See application file for complete search history.

(56) References Cited

U.S. PATENT DOCUMENTS

2007/0047495 A1* 3/2007 Ji et al. ............................ 370/335
2008/0268844 A1* 10/2008 Ma et al. ........................ 455/436
(Continued)

FOREIGN PATENT DOCUMENTS

JP    2007-135194         5/2007
JP    2009-225137 A      10/2009
(Continued)

OTHER PUBLICATIONS

JPOA—Office Action of Japanese Patent Application No. 2013-530899, mailed Oct. 21, 2014, with English translation of the relevant part, p. 3, line 17 to p. 9, line 29, of the Office Action.
(Continued)

*Primary Examiner* — Candal Elpenord
(74) *Attorney, Agent, or Firm* — Fujitsu Patent Center

(57) ABSTRACT

A wireless communication system includes a serving base station, a mobile station, and peripheral base stations. The mobile station communicates with the serving base station. The serving base station includes a sending unit. The sending unit in the serving base station sends, to the mobile station, a signal indicating that communication is going to be performed in cooperation with the peripheral base stations. The mobile station includes a sending unit. The sending unit in the mobile station broadcasts a predetermined request signal to the peripheral base stations in accordance with the reception of the signal. The peripheral base stations, which have received the predetermined request signal, each include a notifying unit. The notifying units individually notify the serving base station of selection information that is information on the peripheral base station that is going to communicate with the mobile station in cooperation with the serving base station.

12 Claims, 9 Drawing Sheets

(51) Int. Cl.
*H04W 48/20* (2009.01)
*H04W 92/20* (2009.01)

(56) References Cited

U.S. PATENT DOCUMENTS

2009/0111470 A1* 4/2009 Thakare .................. 455/436
2011/0098072 A1* 4/2011 Kim et al. ................ 455/509
2011/0218010 A1* 9/2011 Hoymann et al. ........ 455/513

FOREIGN PATENT DOCUMENTS

| JP | 2010-068107 A | 3/2010 |
|----|---------------|--------|
| JP | 2010-081437 A | 4/2010 |
| JP | 2010-154262 A | 7/2010 |
| JP | 2010-239303 A | 10/2010 |
| JP | 2010-239417 A | 10/2010 |
| WO | WO 2010/073676 A1 | 7/2010 |

OTHER PUBLICATIONS

International Search Report, mailed in connection with PCT/JP2011/069427 and mailed Sep. 20, 2011.

JPOA—Office Action of Japanese Patent Application 2013-530899 mailed Jan. 13, 2015 with English translation of the relevant part, p. 2, line 1 to p. 3, line 24, of the Office Action.

* cited by examiner

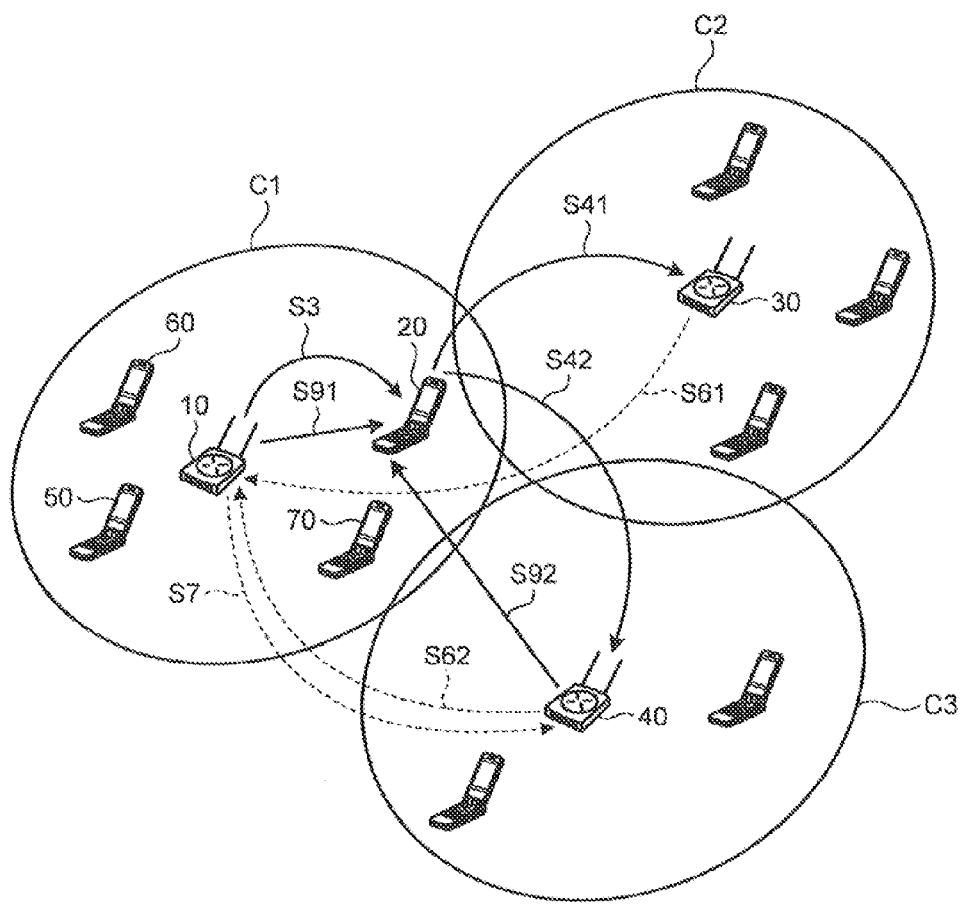

FIG.13

| | CQI | PROPAGATION LOSS | FREE RB COUNT | ACCEPT-ANCE |
|---|---|---|---|---|
| SERVING BASE STATION 10 | 6 | 80 | 6 | - |
| PERIPHERAL BASE STATION 30 | 7 | 70 | 16 | POSSIBLE |
| PERIPHERAL BASE STATION 40 | 5 | 80 | 16 | POSSIBLE |

| | CQI | PROPAGATION LOSS | FREE RB COUNT | ACCEPT-ANCE |
|---|---|---|---|---|
| SERVING BASE STATION 10 | 6 | 80 | 6 | - |
| PERIPHERAL BASE STATION 30 | 5 | 80 | 16 | POSSIBLE |
| PERIPHERAL BASE STATION 40 | 7 | 70 | 16 | POSSIBLE |

203

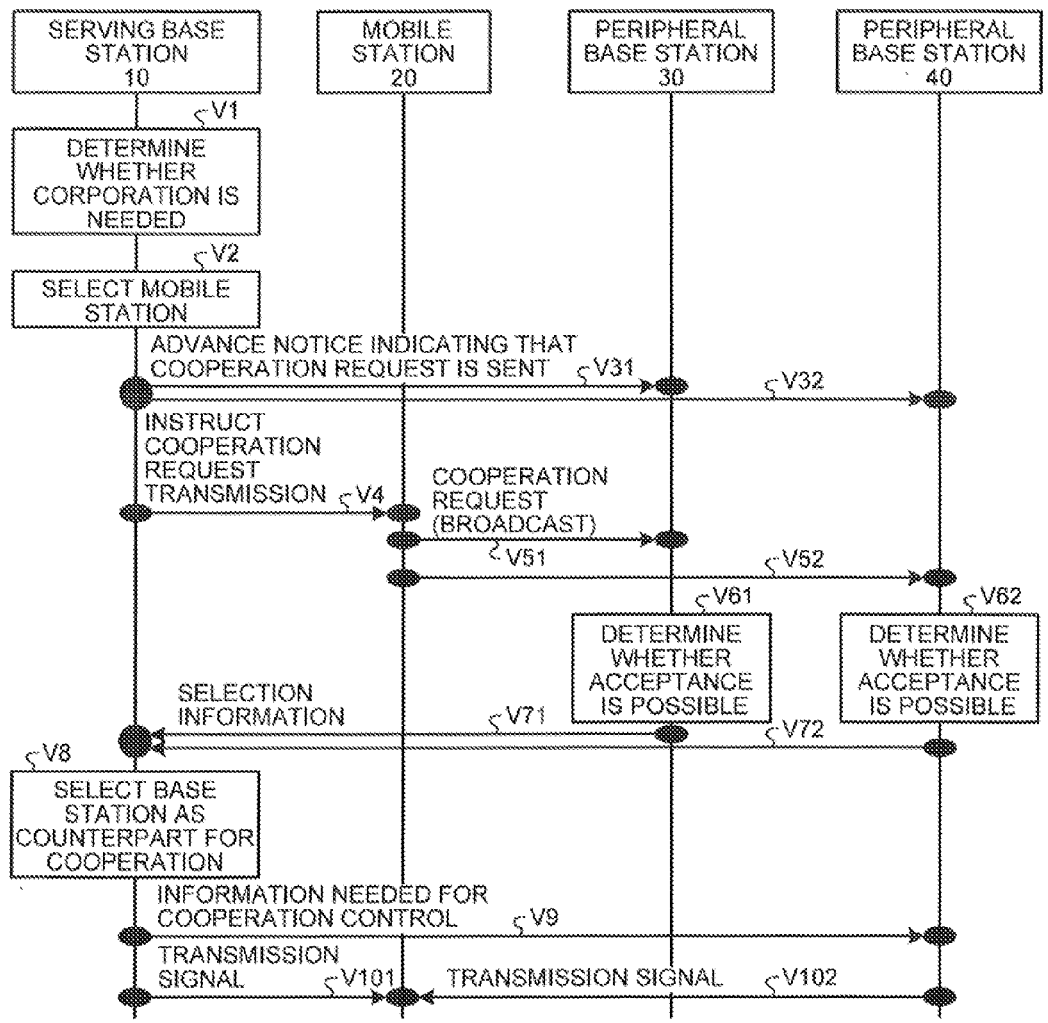

WIRELESS COMMUNICATION SYSTEM, MOBILE STATION, BASE STATION, AND COMMUNICATION METHOD

CROSS-REFERENCE TO RELATED APPLICATION

This application is a continuation of International Application No. PCT/JP2011/069427, filed on Aug. 29, 2011 and designating the U.S., the entire contents of which are incorporated herein by reference.

FIELD

The embodiments discussed herein are directed to a wireless communication system, a mobile station, a base station, and a communication method.

BACKGROUND

In a wireless communication system in which communication is performed by mobile stations via base stations, in order to maintain a predetermined communication quality, there is a related technology in which a base station sends and receives a signal to and from a mobile station by cooperating with a peripheral base station that is other than the base station. In this wireless communication system, first, a mobile station receives a signal from a base station that is currently performing communication (hereinafter, referred to as a "serving base station") and a peripheral base station and then measures, from the received power, the signal-to-interference ratio (SIR) thereof, which is the electrical power ratio between the serving base station and the peripheral base station. Then, based on the measurement result of the SIR, the mobile station selects a peripheral base station with which the serving base station is to cooperate. For example, when a mobile station selects a base station that has the maximum received power from among the peripheral base stations as the counterpart for cooperation, the mobile station sends a signal, to the serving base station, that requests cooperation with the selected base station. The serving base station that receives the request signal from the mobile station sends, to the selected peripheral base station, information needed for cooperation control. Consequently, a plurality of base stations cooperate with each other and thus communication is available with the mobile station.

Patent Document 1: Japanese Laid-open Patent Publication No. 2010-154262
Patent Document 2: Japanese Laid-open Patent Publication No. 2010-239417
Patent Document 3: Japanese Laid-open Patent Publication No. 2010-239303
Patent Document 4: Japanese Laid-open Patent Publication No. 2009-225137

However, with the technology described above, because the cooperation control is led by a mobile station functioning as a terminal, there is, for example, the following problem. Even after the serving base station completes the scheduling of a mobile station accommodated in the serving base station's own cell, the serving base station, due to the occurrence of a cooperation request from the mobile station, needs to re-schedule by taking into consideration the effect on other mobile stations accommodated in the serving base station's own cell. Furthermore, when the peripheral base station is selected as the target for cooperation, because an additional request other than the scheduling to be performed for the selected peripheral base station occurs, there may sometimes be a case in which it is not possible to accurately obtain the channel quality or propagation loss in the uplink direction that is needed for the scheduling. In such a case, the mobile station is not able to accurately predict communication quality with each peripheral base station. Consequently, the mobile station may possibly select a peripheral base station that is not suitable for cooperation as the counterpart for cooperation with the serving base station. This prevents high-quality communication between the mobile station and the plurality of base stations.

SUMMARY

According to an aspect of the embodiments, a wireless communication system includes a plurality of base stations and a mobile station that communicates with a first base station that is included in the plurality of base stations. The first base station includes a first sending unit that sends, to the mobile station, a signal that indicates that communication is going to be performed in cooperation with the plurality of base stations. The mobile station includes a second sending unit that broadcasts, to the plurality of base stations in accordance with reception of the signal, a predetermined request signal. One or more second base stations, which have received the predetermined request signal and are from among the plurality of base stations, each include a notifying unit that notifies the first base station of selection information that is information based on the predetermined request signal and is information on a base station, from among the plurality of base stations, that is going to communicate with the mobile station in cooperation with the first base station.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a schematic diagram illustrating the operation of a wireless communication system according to a first embodiment;

FIG. 5 is a schematic diagram illustrating the communication status of each mobile station that is connected to a serving base station according to the first embodiment;

FIG. 13 is a schematic diagram illustrating the communication status at each base station when a mobile station according to the second embodiment connects thereto;

FIG. 14 is a schematic diagram illustrating the communication status at each base station when another mobile station according to the second embodiment connects thereto;

FIG. 15 is a schematic diagram illustrating the communication status at each mobile station that is connected to a serving base station according to a third embodiment; and FIG. 16 is a sequence diagram illustrating the operation of a wireless communication system according to a fourth embodiment.

DESCRIPTION OF EMBODIMENTS

Preferred embodiments will be explained with reference to accompanying drawings. The wireless communication system, the mobile station, the base station, and the communication method disclosed in the present invention are not limited to the embodiments described below.

[a] First Embodiment

Figure 1:
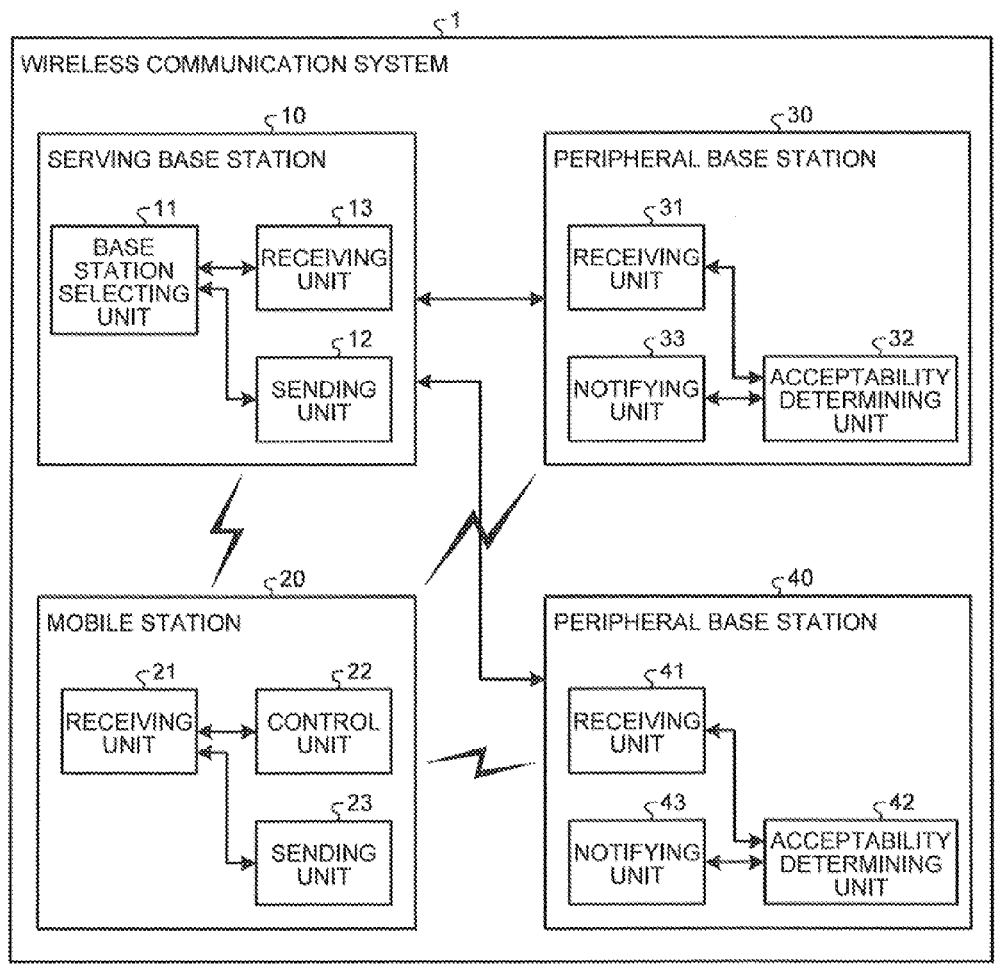
FIG. 1 is a schematic diagram illustrating the functional configuration of a wireless communication system.

FIG. 1 is a schematic diagram illustrating the functional configuration of a wireless communication system 1. As illustrated in FIG. 1, the wireless communication system 1 includes a serving base station 10, a mobile station 20, and peripheral base stations 30 and 40. The serving base station 10 and the peripheral base stations 30 and 40 can send and receive various signals or data to and from the mobile station 20 via radio resources, which are used as a communication channel. Furthermore, the serving base station 10 can send and receive various signals or data to and from the peripheral base stations 30 and 40 via an X2 interface.

The serving base station 10 includes the functions of a base station selecting unit 11, a sending unit 12, and a receiving unit 13. Each of these units is connected such that a signal or data can be input and output in a one-way or two-way direction. Based on the result of the comparison between the total value of the RB usage count and the RB upper limit count of the serving base station 10, the base station selecting unit 11 determines whether cooperation with the peripheral base stations 30 and 40 is needed. The RB upper limit count mentioned here is an indication that is used for the serving base station 10 to perform communication in cooperation with the peripheral base stations 30 and 40. This value can be arbitrarily set by the serving base station 10. Furthermore, based on the communication status, such as a CQI value, a propagation loss, a RB usage count, or the like, the base station selecting unit 11 performs cooperation control with the peripheral base stations 30 and 40, whereby the base station selecting unit 11 selects a mobile station in which the RB usage count is less than the RB upper limit count. Furthermore, based on acceptability information included in selection information, the base station selecting unit 11 selects a peripheral base station that is one of the peripheral base stations 30 and 40 and that can accept the selected mobile station as the base station with which the serving base station 10 cooperates.

The sending unit 12 sends, to the mobile station 20, a cooperation request transmission instruction signal that indicates that the serving base station 10 wants to perform communication in cooperation with the peripheral base stations 30 and 40. Furthermore, in accordance with the selection of a peripheral base station, the sending unit 12 sends, to the selected peripheral base station, information needed for the cooperation control. When the sending unit 12 cooperates with the peripheral base station 40, the sending unit 12 sends a signal to the mobile station 20. The receiving unit 13 receives, from each of the peripheral base stations 30 and 40, selection information and then outputs the selection information to the base station selecting unit 11.

The mobile station 20 includes the functions of a receiving unit 21, a control unit 22, and a sending unit 23. Each of these units is connected such that a signal or data can be input and output in a one-way or two-way direction. The receiving unit 21 receives, from the serving base station 10, the cooperation request transmission instruction signal described above and then outputs the signal to the control unit 22. Furthermore, the receiving unit 21 receives a transmission signal from the serving base station 10 and the peripheral base station 40 with which the receiving unit 21 cooperates. When the control unit 22 receives an input of the cooperation request transmission instruction signal from the receiving unit 21, the control unit 22 instructs the sending unit 23 to broadcast a cooperation request signal. When the sending unit 23 receives the instruction from the control unit 22, the sending unit 23 broadcasts a predetermined request signal to the plurality of peripheral base stations 30 and 40 in accordance with the reception of the cooperation request transmission instruction signal.

The peripheral base station 30 includes the functions of a receiving unit 31, an acceptability determining unit 32, and a notifying unit 33. Each of these units is connected such that a signal or data can be input and output in a one-way or two-way direction. The receiving unit 31 receives, from the mobile station 20, the broadcast cooperation request signal. When the cooperation request signal is received, the acceptability determining unit 32 calculates a free RB count in its own station obtained when the resources are allocated to the mobile station 20. The acceptability determining unit 32 determines, based on the calculation result, whether the reception quality of the mobile station that is being connected to the peripheral base station 30 can be maintained even when the mobile station 20 is connected. Based on the determination result, the acceptability determining unit 32 determines whether the mobile station 20 can be accepted. The notifying unit 33 notifies the serving base station 10 of selection information that is based on the predetermined request signal described above and that is related to a base station, between the plurality of peripheral base stations 30 and 40, that is going to communicate with the mobile station 20 in cooperation with the serving base station 10.

The peripheral base station 40 has the same configuration as that of the peripheral base station 30 described above. Specifically, the peripheral base station 40 includes the functions of a receiving unit 41, an acceptability determining unit 42, and a notifying unit 43. Accordingly, components having the same configuration are assigned reference numerals with the same last numbers and descriptions of such components in detail are omitted.

Figure 2:
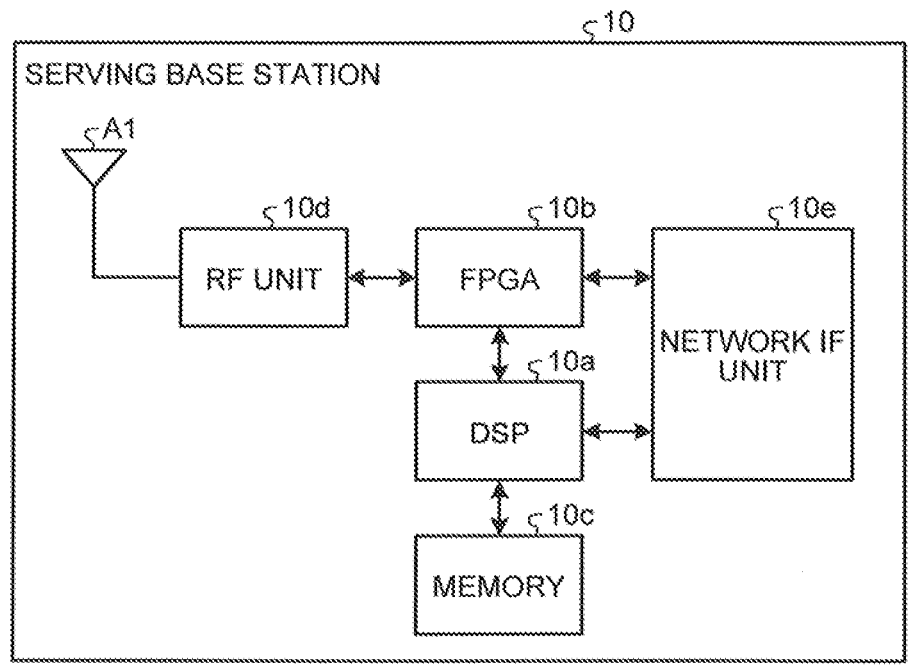
FIG. 2 is a schematic diagram illustrating the hardware configuration of a base station.

FIG. 2 is a schematic diagram illustrating the hardware configuration of the serving base station 10. As illustrated in FIG. 2, the serving base station 10 includes, as hardware configuration components, a digital signal processor (DSP) 10a, a field programmable gate array (FPGA) 10b, a memory 10c, a radio frequency (RF) unit 10d, and a network interface (IF) unit 10e. The DSP 10a and the FPGA 10b are connected with each other via the network IF unit 10e, which can be a switch, such that various signals or data can be input or output. The RF unit 10d includes an antenna A1. The memory 10c is formed by, for example, a RAM, such as a synchronous dynamic random access memory (SDRAM), or the like; a read only memory (ROM); or a flash memory. The base station selecting unit 11 is implemented by an integrated circuit, such as the DSP 10a, the FPGA 10b, or the like. The sending unit 12 and the receiving unit 13 are implemented by the RF unit 10d. As described above, the hardware configuration of the serving base station 10 has been described; however, the hardware configuration of the peripheral base stations 30 and 40 and the association relationship of each component are the same as those of the serving base station 10. Consequently, components having the same configuration are assigned the same reference numerals and descriptions of such components in detail are omitted.

Figure 3:
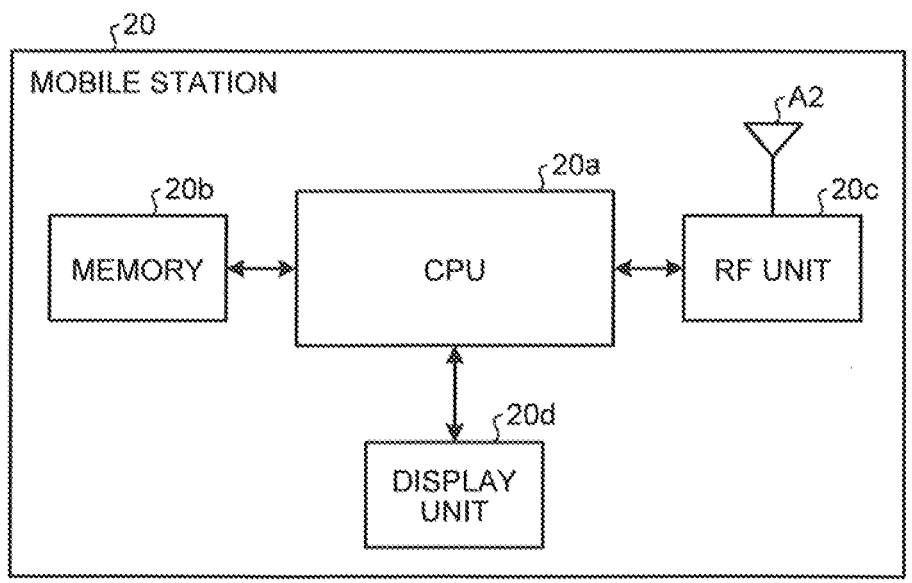
FIG. 3 is a schematic diagram illustrating the hardware configuration of a mobile station.

Furthermore, the mobile station 20 described above is physically implemented by, for example, a mobile phone. FIG. 3 is a schematic diagram illustrating the hardware configuration of the mobile station 20. As illustrated in FIG. 3, the mobile station 20 includes, as hardware, a central processing unit (CPU) 20a, a memory 20b, an RF unit 20c that includes an antenna A2, and a display unit 20d, such as a liquid crystal display (LCD) display, or the like. The memory 20b is formed by, for example, a RAM, such as an SDRAM, or the like; a ROM; or a flash memory. The control unit 22 is implemented by an integrated circuit, such as the CPU 20a, or the like. The receiving unit 21 and the sending unit 23 are implemented by the RF unit 20c.

In the following, the operation of the wireless communication system 1 according to the first embodiment will be described. FIG. 4 is a schematic diagram illustrating the operation of the wireless communication system 1 according to a first embodiment. In the following, for convenience of description, as illustrated in FIG. 4, a description will be given with the assumption that four mobile stations 20, 50, 60, and 70 are located in a cell C1 of the serving base station 10 and communicate with the serving base station 10 via a radio channel. Furthermore, it is assumed that the number of radio resources included in the serving base station 10 and the peripheral base stations 30 and 40 is "50 resource blocks (RBs)". It is assumed that the number of radio resources that can be used from among these 50 RBs is "40 RBs" in each base station. Specifically, although each base station may use up to the maximum of 50 RBs, each base station can have a margin corresponding to 10 RBs such that each base station can meet a request, such as a connection with a new mobile station or connection at higher rate. This "40 RBs" is used as a threshold when it is determined whether cooperation due to a shortage of the resources is needed.

FIG. 5 is a schematic diagram illustrating the communication status of each of the mobile stations 20, 50, 60, and 70 that are connected to the serving base station 10 according to the first embodiment. In FIG. 5, the value of the channel quality indicator (CQI) that represents the quality of a radio channel is set to 15 levels. The quality of a channel is more satisfactory as the CQI value increases. Furthermore, the value of the propagation loss increases as the distance from the serving base station 10 increases. The value of the propagation loss at the boundary of a cell is about 90 to 100 dBs. The upper limit of the number of available radio resources is "40 RBs" as described above; however, the total value of the RB usage count of four mobile stations is 34 (=8+8+8+10) RBs. Consequently, in the initial state, allocation of the radio resource shortage does not occur in a cell C1.

Figure 6:
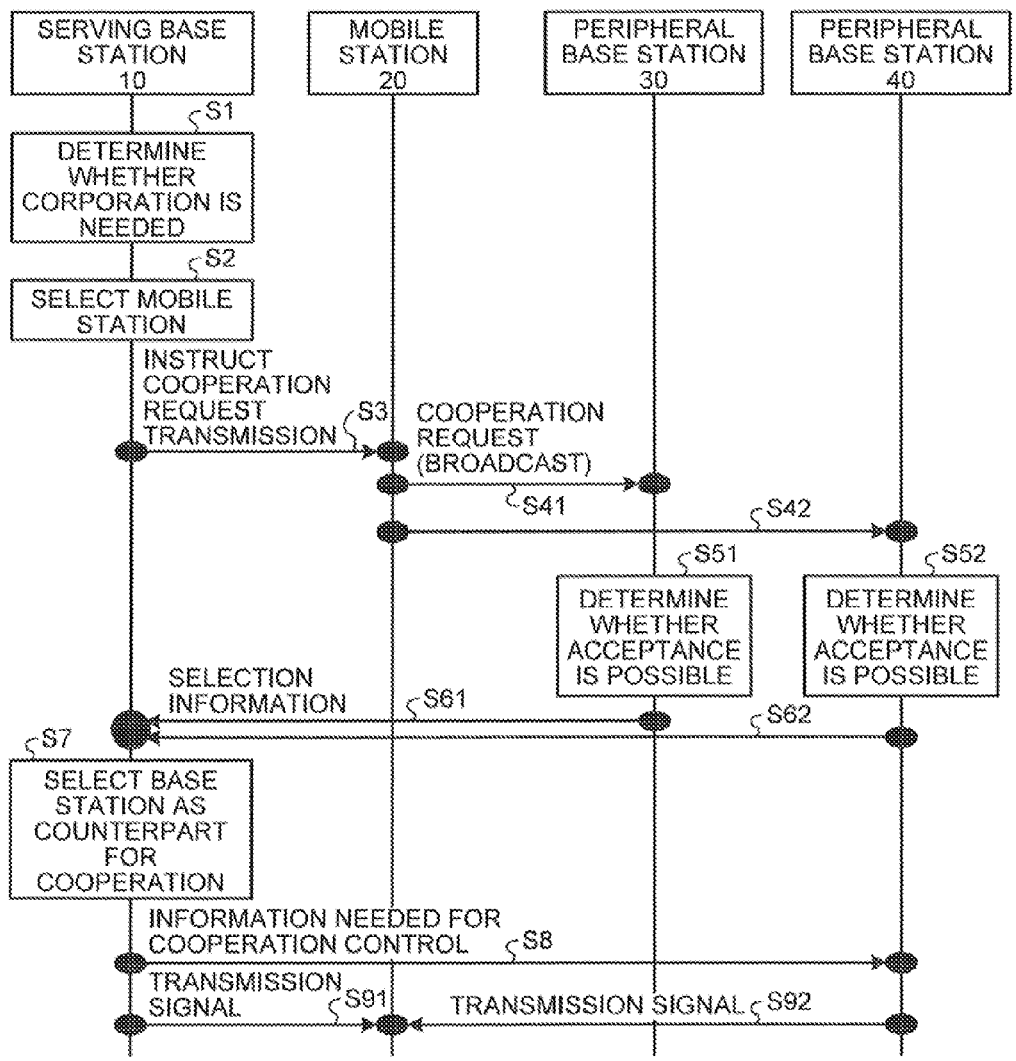
FIG. 6 is a sequence diagram illustrating the operation of the wireless communication system according to the first embodiment.

FIG. 6 is a sequence diagram illustrating the operation of the wireless communication system 1 according to the first embodiment. It is assumed that, at Step S1, the RB count of the radio resources needed for the mobile station 20 increases from the previously used "8 RBs" to "16 RBs". Accordingly, the total value of the RB usage count of the mobile stations 20, 50, 60, and 70 connected to the serving base station 10 increases to "42 RBs" and exceeds "40 RBs", which is the upper limit. The serving base station 10 monitors the total value of the RB usage count and determines, based on the result of the comparison between the total value and "40 RBs", whether corporation with the peripheral base stations 30 and 40, which are the other base stations with respect to the serving base station 10, is needed. Specifically, if the total value of the RB usage count is greater than 40 RBs, the serving base station 10 determines to communicate with a mobile station in the cell C1 in cooperation with the other base stations.

Examples of when the needed RB count increases in a mobile station include when a large file is downloaded or when a mobile station moves to the boundary of a cell.

At Step S2, as preprocessing that allocates the RB count needed for the mobile station 20, the serving base station 10 selects a mobile station for choosing a peripheral base station that becomes the counterpart for the cooperation. This selection is performed based on, for example, the CQI value, the propagation loss, and the RB usage count. Specifically, because the path loss increases and the CQI value decreases as the mobile station locates closer to the boundary of the cell, the serving base station 10 selects the mobile station with the minimum value of CQI (the mobile station 20 illustrated in FIG. 5). Consequently, the serving base station 10 can select the mobile station that is closer to the peripheral base station as a mobile station for selecting the counterpart for the cooperation. Thus, the selected mobile station can easily communicate with a plurality of base stations. Alternatively, the serving base station 10 selects the mobile station with the maximum RB usage count (the mobile station 20 in which the RB count is increased to "16 RBs"). Consequently, because the mobile station with a larger value of the RB usage count is selected as a mobile station for selecting the counterpart for the cooperation, the serving base station 10 can share the RB usage count for the mobile station with the other peripheral base stations. Thus, the free radio resources increase, and thus the effectiveness of the reduction of the RB usage count is improved.

At Step S3, by sending a cooperation request transmission instruction signal to the mobile station 20, the serving base station 10 instructs the mobile station 20 to send a signal that requests, from the peripheral base stations 30 and 40, cooperation with the serving base station 10. The cooperation request transmission instruction signal functions, in the mobile station 20, as a request signal to be broadcast. The mobile station 20 that has received the instruction broadcasts a cooperation request signal in the uplink direction that can be received by base stations including at least the peripheral base stations 30 and 40 (Steps S41 and S42). This broadcast transmission is performed by adding, for example, a random access signal. Because the transmission signal that is broadcast is a free channel signal to which a key, such as a cell ID, is not attached, the signal can also be received by the peripheral base stations 30 and 40 that are not currently connected to the mobile station 20.

When each of the peripheral base stations 30 and 40 receives, from the mobile station 20, the cooperation request signal that was broadcast at Steps S41 and S42, each of the peripheral base stations 30 and 40 calculates the CQI, the propagation loss, and the free RB count that are obtained when the resource is tentatively allocated to the mobile station 20. Based on the calculation results, each of the peripheral base stations 30 and 40 determines whether a predetermined reception level can be maintained even if the mobile station 20 is connected. If it is determined that the reception level can be maintained by each of the peripheral base stations 30 and 40, then it is determined that the acceptance of the mobile station 20 is "possible", whereas, if it is determined that the reception level is not able to be maintained by each of the peripheral base stations 30 and 40, then it is determined that the acceptance of the mobile station 20 is "not possible" (Steps S51 and S52). The availability of the acceptance is determined by taking into consideration not only the communication quality of the mobile station 20 before it is connected but also the communication quality of all of the mobile stations that are already connected to each of the peripheral base stations 30 and 40. Consequently, even if each of the peripheral base stations 30 and 40 accepts the mobile station 20, new radio resources can be allocated to the mobile station 20 without reducing the communication quality of other mobile stations. Consequently, the communication environment in the entirety of the cells C2 and C3 can be satisfactorily maintained.

Figure 8:
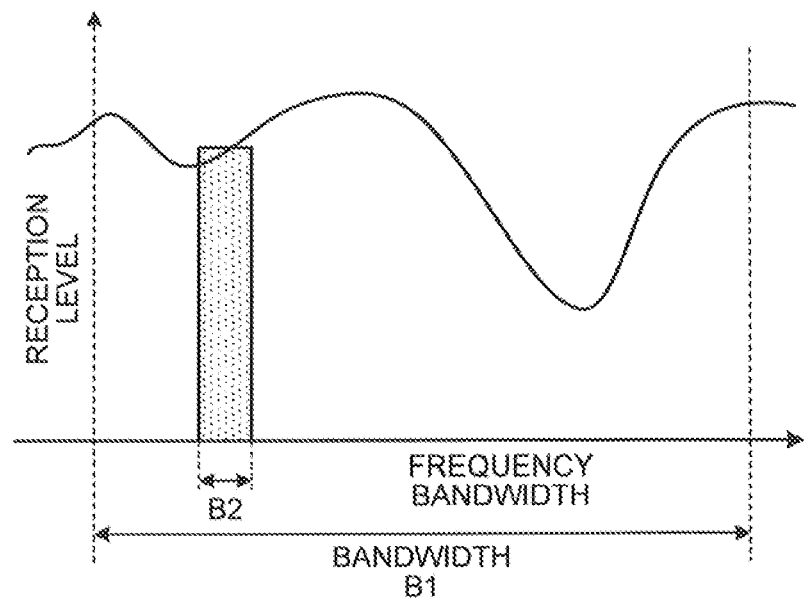
FIG. 8 is a schematic diagram illustrating the state of a level variation when a broadcast signal is sent for each bandwidth.
Figure 9:
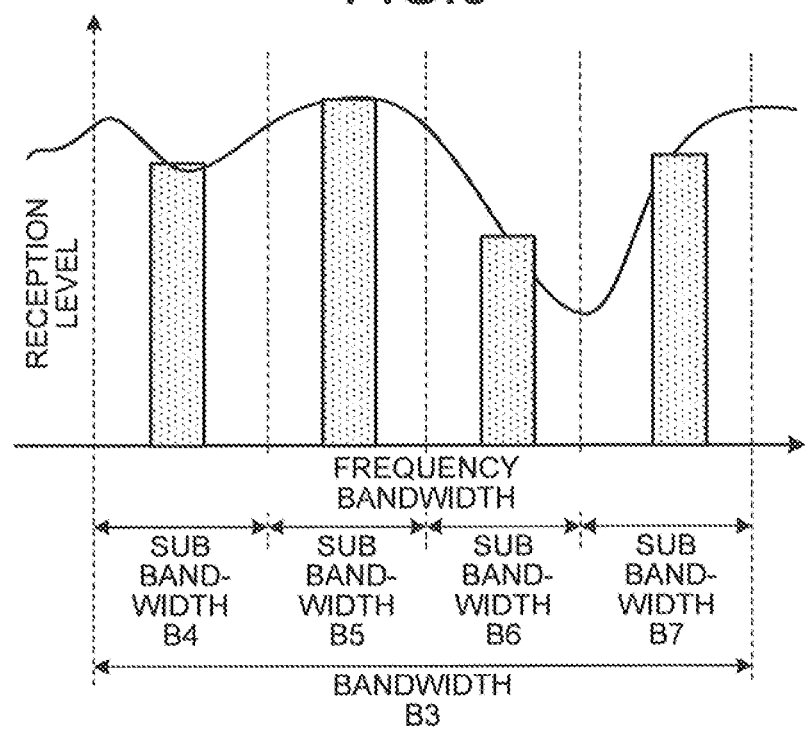
FIG. 9 is a schematic diagram illustrating variations in levels when a broadcast signal is sent in each sub bandwidth.

In the following, a method will be described, with reference to FIGS. 7 to 9, in which each of the peripheral base stations 30 and 40 calculates (schedules), from a broadcast signal in the uplink direction sent from the mobile station 20, the CQI and the propagation loss in the downlink direction.

Figure 7:
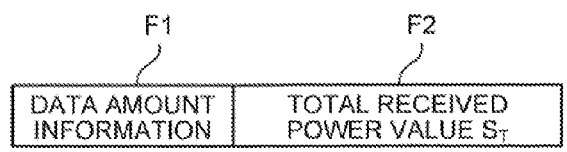
FIG. 7 is a schematic diagram illustrating an example of the format of a broadcast signal in the uplink direction.

FIG. 7 is a schematic diagram illustrating an example of the format of a broadcast signal in the uplink direction. As illustrated in FIG. 7, the broadcast signal in the uplink direction includes a data area F1 and a data area F2. The data area F1 is an area in which information that indicates the amount of data sent by the mobile station 20 is stored as the "data amount information". The data area F2 is an area in which the total value of the electrical power values of the signals received by the mobile station 20 from the peripheral base stations 30 and 40 is stored as the "total received power value Sr".

When receiving the broadcast signal, each of the peripheral base stations 30 and 40 measures, in each of the base stations, the received power of the broadcast signal and then calculates the path loss based on the measurement results. Then, each of the peripheral base stations 30 and 40 subtracts the calculated path loss from its own transmission power value, whereby the incoming call electrical power value $S_1$ in the mobile station 20 is calculated. Subsequently, each of the peripheral base stations 30 and 40 subtracts S1 from the total received power value $S_T$ that was reported by the broadcast signal, whereby the interference power value $S_I$ in the mobile station 20 is calculated. Then, from the interference power value $S_I$ and the data amount information in the data area F1 of the broadcast signal (see FIG. 7), each of the peripheral base stations 30 and 40 estimates the state of or the number of resources that can be allocated to the mobile station 20 (for example, the CQI, the propagation loss, and the RB count in the downlink direction). Consequently, each of the peripheral base stations 30 and 40 can schedule the mobile station 20 in the downlink direction.

With the method described above, because it is assumed that the interference power value Sx in the mobile station 20 is calculated, there may be a case in which each of the peripheral base stations 30 and 40 is not able to accurately estimate the $S_I$ value of the bandwidth that has not been used for sending the broadcast signal. Specifically, as illustrated in FIG. 8, in general, a broadcast signal in the uplink direction is sent by being allocated to a specific bandwidth B1. Consequently, when a variation of the reception level in a bandwidth B1 is small, it is easy to estimate the reception level. However, in particular, when a variation of the reception level due to the fading is great, each of the peripheral base stations 30 and 40 is not able to accurately detect the reception level outside a bandwidth B2 that was used for sending the broadcast signal. Consequently, there may be a case in which each of the peripheral base stations 30 and 40 is not able to calculate the accurate interference power value $S_I$.

Accordingly, the bandwidth used for the broadcasting may also be divided into a plurality of sub bandwidths. FIG. 9 is a schematic diagram illustrating variations in levels when a broadcast signal is sent in each sub bandwidth. In FIG. 9, the frequency bandwidth is represented in the x-axis and the reception level of the broadcast signal in the uplink direction is represented in the y-axis. The frequency bandwidth includes a bandwidth B3 and a plurality of sub bandwidths B4, B5, B6, and B7, which are included in the bandwidth B3. As illustrated in FIG. 9, the mobile station 20 may send a broadcast signal in each of the plurality of sub bandwidths B4, B5, B6, and B7. Consequently, each of the peripheral base stations 30 and 40 can calculate, for each sub bandwidth, the interference power value $S_I$ from the received broadcast signal. Thus, based on the accurate interference power value $S_I$, each of the peripheral base stations 30 and 40 can calculate the state of or the number of resources (for example, the CQI, the propagation loss, and the RB count in the downlink direction) that can be allocated to the mobile station 20. Consequently, a precise calculation is possible.

Furthermore, when the mobile station 20 sends a broadcast signal in each sub bandwidth, the send time thereof can be changed for each sub bandwidth. Consequently, it is possible to alleviative the broadcast signals being simultaneously concentrated in a certain bandwidth, and thus it is possible to avoid channel congestion. Thus, the communication load applied to the wireless communication system 1 can be reduced.

Subsequently, each of the peripheral base stations 30 and 40 sends, to the serving base station 10, the CQI, the propagation loss, and the free RB count of each of the peripheral base stations 30 and 40, which are obtained when resources are tentatively allocated to the mobile station 20 as selection information together with the information that indicates the acceptability (Steps S61 and S62). This selection information is sent and received by the X2 interface that connects the serving base station 10 and each of the peripheral base stations 30 and 40.

Figure 10:
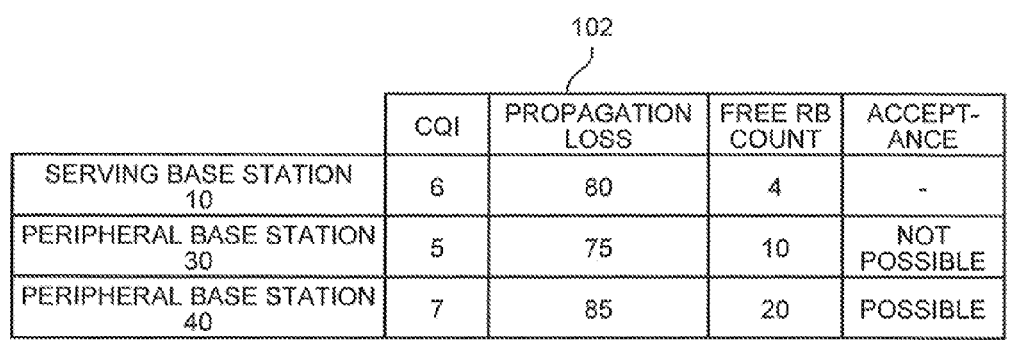
FIG. 10 is a schematic diagram illustrating the communication status at each base station when a mobile station according to the first embodiment connects thereto.

When the serving base station 10 receives the selection information, the serving base station 10 selects, from the peripheral base stations 30 and 40 and based on this information, a base station with which the serving base station 10 will cooperate (Step S7). In the following, a method in which the serving base station 10 selects a base station that is the counterpart for the cooperation will be described in detail with reference to FIG. 10. FIG. 10 is a schematic diagram illustrating the communication status at each base station when the mobile station 20 according to the first embodiment connects thereto. In the first embodiment, as illustrated in FIG. 10, the acceptance of the mobile station 20 by the peripheral base station 30 is "not possible", whereas the acceptance of the mobile station 20 by the peripheral base station 40 is "possible". Consequently, the serving base station 10 selects the peripheral base station 40 as the counterpart for the cooperation.

Furthermore, unlike FIG. 10, when both pieces of the selection information on the peripheral base stations 30 and 40 indicate that the acceptance is "possible", the serving base station 10 refers to the CQI, the propagation loss, and the free RB count, which are another type of selection information, and then determines the counterpart for the cooperation. The priority with which the information is referred to can be arbitrarily set. For example, it is assumed a case in which the priority is set in the order of the CQI, the propagation loss, and the free RB count and the acceptance of the mobile station 20 by both the peripheral base stations 30 and 40 is "possible". In such a case, as illustrated in FIG. 10, the CQI when the mobile station 20 is connected to the peripheral base station 30 is "5", whereas the CQI when the mobile station 20 is connected to the peripheral base station 40 is "7". Consequently, the peripheral base station 40 that can maintain a higher CQI is selected as the counterpart for the cooperation.

Furthermore, when the priority is given in the order of the propagation loss, the CQI, and the free RB count and when the acceptance of the mobile station 20 by both the peripheral base stations 30 and 40 is "possible", the propagation loss when the mobile station 20 is connected to the peripheral base station 30 is "75", whereas the propagation loss when the mobile station 20 is connected to the peripheral base station 40 is "85". Consequently, the peripheral base station 30 with the lower propagation loss is selected as the counterpart for the cooperation. Furthermore, for example, when the priority is given in the order of the free RB count, the CQI, and the propagation loss and when the acceptance of the mobile station 20 by both the peripheral base stations 30 and 40 is "possible", the free RB count when the mobile station 20 is connected to the peripheral base station 30 is "10 RBs", whereas the free RB count when the mobile station 20 is connected to the peripheral base station 40 is "20 RBs". Consequently, the peripheral base station 40 with the greater free RB count, i.e., the peripheral base station 40 that has sufficient resources that can be allocated, is selected as the counterpart for the cooperation.

Furthermore, in the method described above, the serving base station 10 individually compares, in accordance with the order of the priority, each piece of the selection information, i.e., the CQI, the propagation loss, and the free RB count. However, there is no need to individually compare each piece of the selection information. For example, the serving base station 10 may also compare, for the peripheral base stations 30 and 40, the calculated values by using a combination of or the weighting of each piece of the selection information. Consequently, the serving base station 10 can accurately select, as the counterpart base station for the cooperation, a peripheral base station that can provide higher communication quality to the mobile station 20.

A description will be given here by referring back to FIG. 6. At Step S8, the serving base station 10 sends, by using the X2 interface, information needed for its own cooperation control to the peripheral base station 40 that was selected at Step S7. This information is information that indicates, for example, the CQI and the propagation loss of the mobile station 20 in the serving base station 10 or indicates, for example, the free RB count of the serving base station 10. Then, the serving base station 10 starts to communicate with the mobile station 20 in cooperation with the peripheral base station 40. Specifically, both the serving base station 10 and the peripheral base station 40 send a signal to the mobile station 20 (Steps S91 and S92).

In contrast, unlike FIG. 10, when both pieces of the selection information on the peripheral base stations 30 and 40 indicate that the acceptance is "not possible", because no base station that can cooperate is present, the serving base station 10 skips the process at Step S8, moves to the process at Step S91, and then sends a signal to the mobile station 20. Alternatively, the serving base station 10 may also perform the series of processes described above as processes for selecting another mobile station in the serving cell.

As described above, the wireless communication system 1 according to the first embodiment includes the serving base station 10, the mobile station 20, and the peripheral base stations 30 and 40. The mobile station 20 communicates with the serving base station 10. The serving base station 10 includes the sending unit 12. The sending unit 12 sends, to the mobile station 20, a signal indicating that communication is going to be performed in cooperation with the peripheral base stations 30 and 40. The mobile station 20 includes the sending unit 23. The sending unit 23 broadcasts a predetermined request signal to the peripheral base stations 30 and 40 in accordance with the received signal. The peripheral base stations 30 and 40 that have received the predetermined request signal include the notifying units 33 and 43, respectively. Each of the notifying units 33 and 43 notifies the serving base station 10 of the selection information that is information based on the predetermined request signal and that is related to the peripheral base station 40, out of the peripheral base stations 30 and 40, that is going to communicate with the mobile station 20 in cooperation with the serving base station 10.

With the wireless communication system 1 according to the first embodiment, the serving base station 10 can accurately select, between the peripheral base stations 30 and 40, a peripheral base station suitable for cooperation. Specifically, the serving base station 10 selects a mobile station that is used for the cooperation with a peripheral base station by taking into consideration the CQI, the propagation loss, and the RB usage count. Consequently, when a mobile station is selected, a reduction in the communication quality in the entirety of the serving cell can be suppressed. Furthermore, by using the state of the resources that are tentatively allocated by the serving base station 10 based on the broadcast signal received from the selected mobile station 20, the serving base station 10 selects a peripheral base station that acts as the counterpart for the cooperation. At this point, by receiving the broadcast signal, the peripheral base stations 30 and 40 can obtain the CQI or the propagation loss of the mobile station 20; therefore, it is possible to take into consideration the effect on a peripheral base station's own cell when new resources are allocated to the mobile station 20. Consequently, when a peripheral base station is selected, it is possible to maintain the communication quality of the entirety of the cell that is the counterpart for the cooperation. Thus, the load applied to the wireless communication system 1 can be distributed. Even when the number of mobile stations to be accommodated increases, it is possible to maintain the communication quality of the entire system and thus possible to maintain the reliability.

Furthermore, because the wireless communication system 1 according to the first embodiment performs the cooperation control lead by the base station, the following advantage is provided, for example: even after the serving base station 10 completes the scheduling of the mobile station 20 in its own cell, it is possible to avoid a state in which re-scheduling needs to be performed, due to the occurrence of a cooperation request from the mobile station 20, by taking into consideration with the effect on the other mobile stations 50, 60, and 70 in its own cell. Furthermore, when one of the peripheral base stations 30 and 40 is selected as the target for the cooperation, because an additional request other than the scheduling to be performed occurs, it is possible to eliminate the problem in which the quality or the propagation loss of a channel in the uplink direction needed for the scheduling is not accurately determined. Consequently, a factor that inhibits high quality communication between the mobile station 20 and the plurality of base stations 10, 30, and 40 is reduced.

In the first embodiment described above, a description has been given of a case in which the serving base station 10 selects a peripheral base station that is the counterpart for the cooperation; however, the selection target for the counterpart for the cooperation is not limited to the serving base station 10 but may also be the peripheral base stations 30 and 40. Specifically, by sharing the acceptability information on each base station, the peripheral base stations 30 and 40 may directly select a base station that performs the cooperation and then notify the serving base station 10 of the ID of the selected base station.

In such a case, the selection information that is sent and received at Steps S61 and S62 illustrated in FIG. 6 is information that indicates the base station that is going to communicate with the mobile station 20 in cooperation with the serving base station 10. Consequently, the selection information is not limited to the information (information before selection is performed) that is used for the serving base station 10 to select, between the peripheral base stations 30 and 40, the base station that is going to communicate with the mobile station 20 in cooperation with the serving base station 10. The selection information may also be information after the selection is performed. This makes it possible for the selection target that is the counterpart for the cooperation is moved from the serving base station 10 to the peripheral base stations 30 and 40, and thus the processing load for selecting the counterpart for the cooperation in the serving base station 10 can be reduced. Furthermore, in the serving base station 10, the time needed to select the counterpart for the cooperation can be reduced. Consequently, the serving base station 10 promptly starts the cooperation control with the selected peripheral base station. Thus, it is possible to speed up the wireless communication system 1.

Furthermore, with the method described above, a target station that notifies the serving base station 10 of the selection information is does not to be the selected base station itself. For example, when the peripheral base station 30 is selected as the counterpart for the cooperation, the peripheral base station 40, which is the other base station, may also notify the serving base station 10 of the selection information.

Furthermore, the information before the selection is performed is information that indicates, for example, acceptability or is information to determine the acceptability (for example, information that indicates the communication status, such as the CQI, the propagation loss, the free RB count, or the like).

[b] Second Embodiment

In the following, a second embodiment will be described. The configuration of a wireless communication system according to the second embodiment is the same as that in the first embodiment illustrated in FIG. 1. Furthermore, the configurations of a serving base station, a mobile station, and peripheral base stations according to the second embodiment are the same as those of the serving base station 10, the mobile station 20, and the peripheral base stations 30 and 40 in the first embodiment illustrated in FIG. 1. Accordingly, in the second embodiment, components having the same configuration as those in the first embodiment are assigned the same reference numerals and descriptions of such components in detail are omitted. The second embodiment differs from the first embodiment in that the serving base station 10 requests a plurality of mobile stations to broadcast when a peripheral base station is selected as the counterpart for the cooperation. Specifically, in the first embodiment, the serving base station 10 requests broadcasting from the mobile station 20 from among a plurality of mobile stations that are connected to the serving base station 10. In contrast, in the second embodiment, the serving base station 10 requests, in addition to the mobile station 20, the mobile station 70 to broadcast. In the following, the operation of the wireless communication system 1 according to the second embodiment will be given that concentrates on the differences between the first embodiment and the second embodiment.

Figure 11:
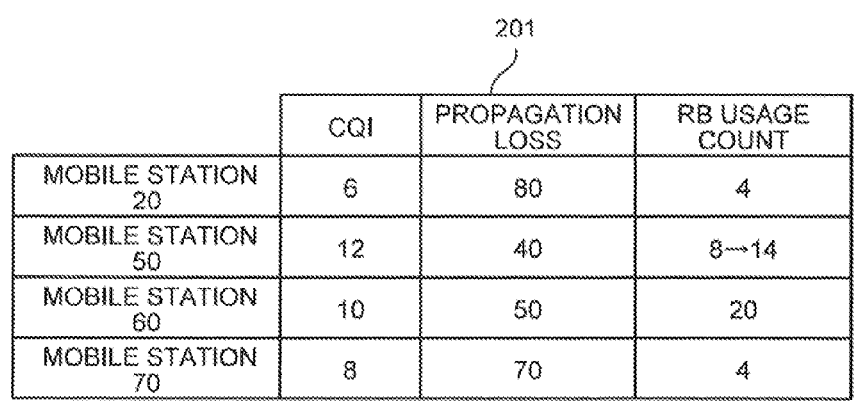
FIG. 11 is a schematic diagram illustrating the communication status at each mobile station that is connected to a serving base station according to the second embodiment.

FIG. 11 is a schematic diagram illustrating the communication status at each of the mobile stations 20, 50, 60, and 70 that is connected to the serving base station 10 according to the second embodiment. In FIG. 11, the CQI value that indicates the quality of a radio channel is set to 15 levels. The quality of a channel is more satisfactory as the CQI value increases. Furthermore, the value of the propagation loss increases as the distance from the serving base station 10 increases. The value of the propagation loss at the boundary of a cell is about 90 to 100 dBs. Similarly to the first embodiment, the upper limit of the number of available radio resources is set to "40 RBs"; however, the total value of the RB usage count of four mobile stations is 36(=4+8+20+4) RBs. Consequently, in the initial state, allocation of the radio resource shortage does not occur in the cell C1.

Figure 12:
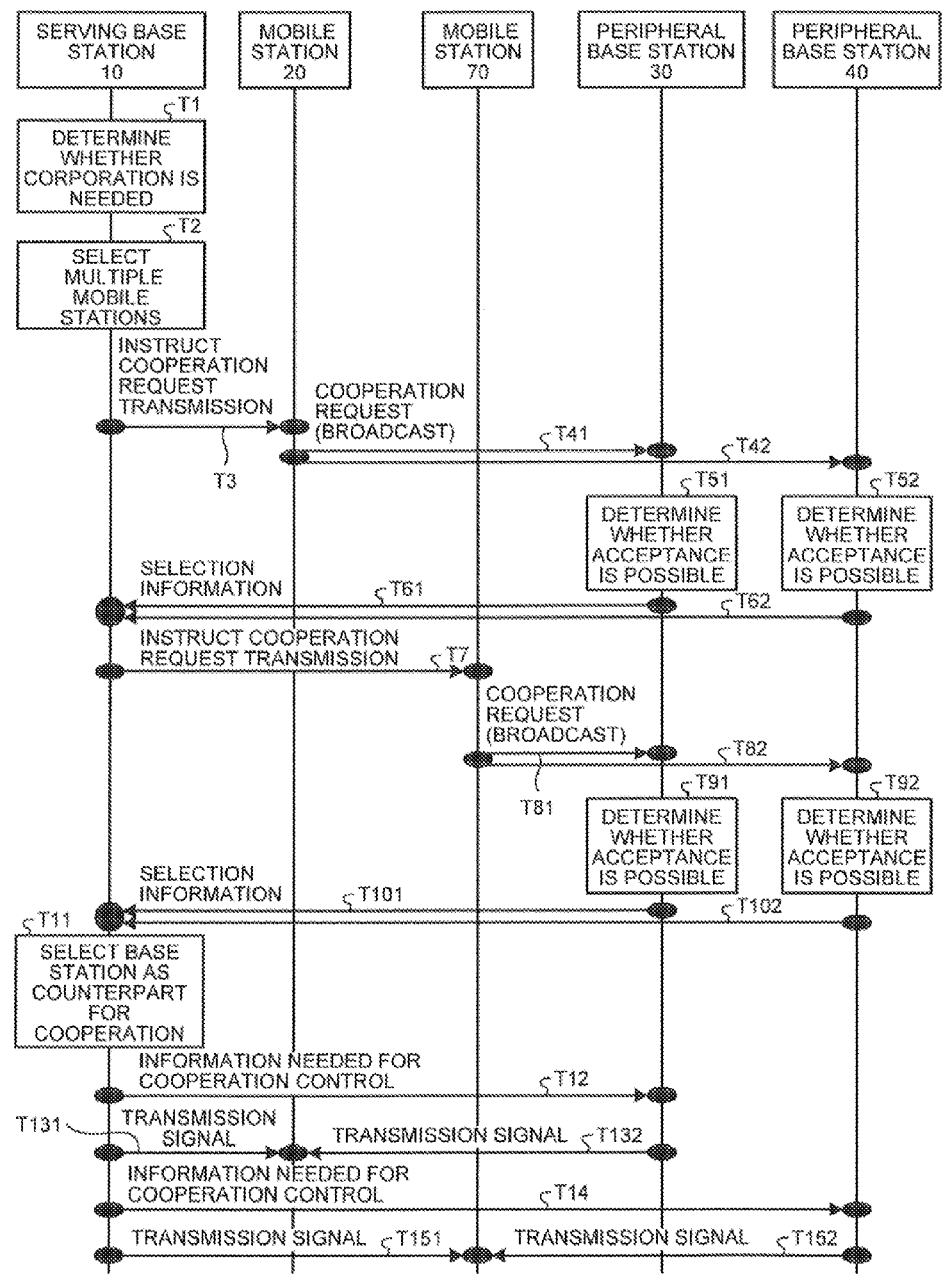
FIG. 12 is a sequence diagram illustrating the operation of a wireless communication system according to the second embodiment.

FIG. 12 is a sequence diagram illustrating the operation of the wireless communication system 1 according to the second embodiment. Because the operation illustrated in FIG. 12 is the same as that in the first embodiment illustrated in FIG. 6 except for the process at Step T2, processes performed at the same steps are assigned reference numerals with the same last numbers and descriptions of such process in detail are omitted. Specifically, Steps T1 to T62 illustrated in FIG. 12 correspond to Steps S1 to S62 illustrated in FIG. 6, respectively. Furthermore, Steps T7 to T102 illustrated in FIG. 12 correspond to Steps S3 to S62 illustrated in FIG. 6, respectively. Furthermore, Steps T11 to T132 illustrated in FIG. 12 correspond to Steps S7 to S92 illustrated in FIG. 6, respectively. Furthermore, Steps T14 to T152 illustrated in FIG. 12 correspond to Steps S8 to S92 illustrated in FIG. 6, respectively.

In the initial state, it is assumed that, because the mobile station 50 requests the serving base station 10 to send a large volume of data, the RB count of the radio resources needed for the mobile station 50 increases from the previously used "8 RBs" to "14 RBs". Consequently, the total value of the RB usage count of the mobile stations 20, 50, 60, and 70 connected to the serving base station 10 increases from "36 RBs" to "42 RBs". Thus, the total value of the RB usage count exceeds "40 RBs", which is the upper limit of the threshold. Because the total value of the RB usage count is greater than 40 RBs, the serving base station 10 attempts to cooperate with another base station. At Step T2, the serving base station 10 outputs, to the plurality of mobile stations 20 and 70, a transmission instruction that is a cooperation request. Each of the mobile stations 20 and 70 that has received the instruction performs broadcast transmission and communicates with one of the peripheral base stations 30 and 40 that is suitable for communication with the corresponding mobile station.

In the second embodiment, it is assumed that, at Step T2, the serving base station 10 selects a mobile station by using the propagation loss as a reference. The mobile station with a large propagation loss, i.e., a mobile station located closer to the boundary of a cell, becomes as the origin of a broadcast and performs the broadcast transmission, whereby each of the mobile stations can communicate with a peripheral base station that is closer to its own mobile station. In the second embodiment, as illustrated in FIG. 11, the propagation losses of the mobile stations 20 and 70 are high, i.e., "80 dBs" and "70 dBs", respectively, and the total RB count is equal to or less than the upper limit due to a reduction in the RB usage count of these two mobile stations 20 and 70. Consequently, the serving base station 10 selects the plurality of mobile stations 20 and 70 as the mobile stations targeted for the request for the broadcast transmission (Step T2).

FIG. 13 is a schematic diagram illustrating the communication status at each base station when the mobile station 20 according to the second embodiment connects thereto. As illustrated in FIG. 13, both the peripheral base stations 30 and 40 determine that the acceptance of the mobile station 20 is "possible". FIG. 14 is a schematic diagram illustrating the communication status at each base station when another mobile station 70 according to the second embodiment connects thereto. Similarly to a case illustrated in FIG. 14, both the peripheral base stations 30 and 40 determine that the acceptance of the mobile station 70 is "possible". However, the propagation loss differs between the peripheral base stations 30 and 40. Specifically, the propagation loss of the mobile station 20 in the peripheral base station 30 is smaller than that in the peripheral base station 40. In contrast, the propagation loss of the mobile station 70 in the peripheral base station 40 is smaller than that in the peripheral base station 30. Consequently, the serving base station 10 uses the value of the propagation loss as the reference for selecting a peripheral base station and selects a peripheral base station such that the propagation loss of the mobile station connected to the peripheral base station becomes further smaller (such that the communication quality becomes high). In the second embodiment, the peripheral base station that has a lower propagation loss for the mobile station 20 is the peripheral base station 30 and the peripheral base station that has a lower propagation loss for the mobile station 70 is the peripheral base station 40. Consequently, the serving base station 10 selects the peripheral base station 30 as the counterpart for the communication with the mobile station 20 and selects the peripheral base station 40 as the counterpart for the communication with the mobile station 70 (Step T11).

Furthermore, the serving base station 10 may also use the CQI value as the reference for selecting a peripheral base station. Specifically, even if it is assumed that the serving base station 10 selects, with priority, a peripheral base station with a greater CQI value instead of a peripheral base station with a smaller propagation loss, in the second embodiment, the same result described above is obtained. Furthermore, it is assumed that the signal that instructs the transmission (broadcast) of a cooperation request is sent to in the order of the mobile stations 20 and 70; however, the signal may also be sent in the order of the mobile stations 70 and 20. Similarly, no particular order of the transmission is needed for the cooperation request (broadcast) signal.

As described above, with the wireless communication system 1 according to the second embodiment, the cooperation performed by the serving base station 10 is possible for a plurality of mobile stations. In the second embodiment, when the free RB count of the peripheral base stations 30 and 40 is small, the serving base station 10 selects, with priority, a plurality of mobile stations in which the RB usage count in the serving base station 10 is small. Consequently, the serving base station 10 can perform the cooperation control by distributing mobile stations connected to the serving base station 10 to the plurality of peripheral base stations 30 and 40. Thus, even when the cooperation control is performed by using a plurality of mobile stations, the load due to the allocation of the resources can be distributed. Consequently, the load applied to each of the peripheral base stations 30 and 40 can be reduced when compared with a case in which a single peripheral base station accepts a plurality of mobile stations. Furthermore, in the serving base station 10, because the RB usage count of the plurality of mobile stations is reduced, an increase in the free RB count become great. Consequently, it is possible to effectively use the resources in the entire of the wireless communication system 1.

Furthermore, in the second embodiment, a description has been given of a case in which the separate peripheral base stations 30 and 40 accept the plurality of mobile stations 20 and 70, respectively. However, when the free RB count of the peripheral base station is sufficient, one of the peripheral base stations may accept both the mobile stations 20 and 70. Furthermore, the number of the mobile stations that are accepted is not limited two. An arbitrary number of mobile stations that are accepted can be set as long as it does not exceeds the upper limit of the threshold of the RB count.

In contrast, when the free RB count is insufficient in a peripheral base station on the accept side, the serving base station 10 may also select the plurality of peripheral base stations 30 and 40 for a single mobile station. Consequently, each of the base stations can allocate the resources needed by the mobile station by sharing the resources with a greater number of base stations. Thus, even when free resources are insufficient in any of the peripheral base stations, the serving base station 10 can communicate with the mobile station 20 in cooperation with the peripheral base stations 30 and 40, which are the other peripheral base stations. Consequently, it is easy to eliminate the resource shortage, and thus the flexibility of the wireless communication system 1 increases.

Furthermore, in the second embodiment, because each of the peripheral base stations 30 and 40 individually determines whether it can accept a mobile station, the result of the acceptance obtained from one peripheral base station is not always reflected in the determination of the acceptability determined by the other peripheral base station. For example, when the peripheral base station 30 accepts the mobile station 20, due to this acceptance, for the relationship between the peripheral base station 40 and the mobile stations 20 and 70, the communication status, such as the CQI, the propagation loss, the free RB count, or the like, may possible change. Consequently, the peripheral base station 40 preferably determines whether the mobile stations 20 and 70 are accepted after the change in the communication status is reflected.

Accordingly, the order may be set to the peripheral base stations that perform the acceptability determination and then the determination result of the acceptance obtained from one peripheral base station may be sent to the other peripheral base station as a notification. For example, when the order of the acceptability determination is set in the order of the peripheral base stations 30 and 40, after the peripheral base station 30 determines whether the acceptance is possible for the peripheral base station 30, the peripheral base station 30 notifies the peripheral base station 40 of that result. Then, in response to the determination result, the peripheral base station 40 determines whether the mobile stations 20 and 70 can be accepted, under the assumption that the peripheral base station 30 has accepted the mobile station 20. Consequently, the peripheral base station 40 can determine whether to accept the mobile station by taking into consideration the communication status of the peripheral base station 30, which is the other peripheral base station. Thus, each of the peripheral base stations 30 and 40 can determine, based on the communication status that is closer to the actual condition, a mobile station to be accepted. Furthermore, this makes it possible for the serving base station 10 to select a peripheral base station in accordance with the actual condition. Consequently, the accuracy of selecting a peripheral base station, which is the counterpart for the cooperation, is increased.

Furthermore, as another method, instead of determining the acceptability, the peripheral base stations 30 and 40 may store information to be sent to the serving base station 10 as a notification in the information on the CQI, the propagation loss, and the free RB count. Specifically, each of the peripheral base stations 30 and 40 may leave the determination of acceptability to the serving base station 10 and the serving base station 10 may determine, based on each piece of the information described above, whether each of the peripheral base stations 30 and 40 can be accepted. This makes it possible to reliably avoid a case in which the result of the acceptance of one peripheral base station is not reflected in the determination of the acceptability performed by the other peripheral base station. Specifically, the serving base station 10 can select a peripheral base station based on communication status that is closer to the actual condition. Consequently, it is possible to improve the accuracy of selecting a peripheral base station that is the counterpart for the cooperation.

[c] Third Embodiment

In the following, a third embodiment will be described. The configuration of a wireless communication system according to the third embodiment is the same as that of the wireless communication system in the first embodiment illustrated in FIG. 1. Furthermore, the configurations of a serving base station, a mobile station, peripheral base stations according to the third embodiment are the same as those of the serving base station 10, the mobile station 20, and the peripheral base stations 30 and 40 in the first embodiment illustrated in FIG. 1. Accordingly, in the third embodiment, components having the same configuration as those in the first embodiment are assigned the same reference numerals and descriptions of such components in detail are omitted.

The third embodiment differs from the first embodiment in that the mobile station 20 requests, from the serving base station 10, that the mobile station 20 is selected as a mobile station that sends a cooperation request (broadcast). Specifically, in the first embodiment, the mobile station 20 does not send a cooperation request; however, the serving base station 10 selects a mobile station based on the CQI value, the propagation loss, and the RB usage count. In contrast, in the third embodiment, the serving base station 10 monitors the presence or absence of a request (cooperation control request) from a mobile station located in the cell of the serving base station 10 and then selects a mobile station by taking into consideration the presence or absence of the request.

FIG. 15 is a schematic diagram illustrating the communication status at each of the mobile stations 20, 50, 60, and 70 that are connected to the serving base station 10 according to a third embodiment. As illustrated in FIG. 15, it is assumed that the RB count of the radio resources needed for the mobile station 50 increases from the previously used "8 RBs" to "16 RBs". Consequently, the total value of the RB usage count of the mobile stations 20, 50, 60, and 70 connected to the serving base station 10 increases from "36 RBs" to "44 RBs". Consequently, the total value of the RB usage count exceeds "40 RBs", which is the upper limit of the threshold. Thus, the serving base station 10 selects, in order to perform communication in cooperation with the other base stations, a mobile station that performs broadcast transmission.

When selecting a mobile station, the serving base station 10 takes into consideration a request from the mobile station. In the third embodiment, the serving base station 10 narrows down the mobile stations 20, 50, 60, and 70 to the mobile stations 20 and 70 with a high propagation loss and a low CQI value as a candidate for the selection. At this point, when the mobile station 20 sends a cooperation control request to the serving base station 10, if a predetermined condition is satisfied, the mobile station 20 is selected to which higher priority that that of the mobile station 70 is given. The predetermined condition mentioned here is a condition in which, for example, the total value of the RB count is equal to or less than 40 RBs, which is the upper limit, due to a reduction in the RB usage count (12 RBs) of the mobile station 20. In the third embodiment, due to a reduction in the RB usage count of the mobile station 20, the total RB count of the mobile stations 20, 50, 60, and 70 connected to the serving base station 10 is 32 RB, which is below the upper limit. Consequently, because the mobile station 20 satisfies the condition described above, the serving base station 10 selects the mobile station 20 as the station that performs the broadcasting.

As described above, the wireless communication system 1 according to the third embodiment is particularly effective when the communication status of accommodated mobile stations is the same or similar and when it is difficult for the serving base station 10 to select a mobile station. Specifically, after the serving base station 10 determines that the serving base station 10 needs cooperation with a peripheral base station, the serving base station 10 monitors the presence or absence of a selection request from a mobile station and then selects, with priority from among a plurality of mobile stations whose communication status is the same or similar, a mobile station that has sent the selection request. Consequently, the serving base station 10 can easily and promptly select a mobile station. Furthermore, the wireless communication system 1 can perform the cooperation control without reducing the communication quality of the entirety of the serving cell as much as possible while maintaining the communication quality of the mobile station that has sent the selection request described above.

[b] Fourth Embodiment

In the following, a fourth embodiment will be described. The configuration of a wireless communication system according to the fourth embodiment is the same as that of the wireless communication system according to the first embodiment illustrated in FIG. 1. Furthermore, the configurations of a serving base station, a mobile station, and peripheral base stations according to the fourth embodiment are the same as those of the serving base station 10, the mobile station 20, and the peripheral base stations 30 and 40 according to the first embodiment illustrated in FIG. 1. Accordingly, in the fourth embodiment, components having the same configuration as those in the first embodiment are assigned the same reference numerals and descriptions of such components in detail are omitted.

The fourth embodiment differs from the first embodiment in that, before sending a cooperation request transmission instruction, the serving base station 10 notifies, in advance, the peripheral base stations 30 and 40 that a cooperation request will be sent (broadcast transmission). In the following, the operation of the wireless communication system 1 according to the fourth embodiment will be given that concentrates on the differences between the first embodiment and the fourth embodiment.

FIG. 16 is a sequence diagram illustrating the operation of the wireless communication system 1 according to a fourth embodiment. Because the operation illustrated in FIG. 16 is the same as that in the first embodiment illustrated in FIG. 6 except for the processes at Steps V31 and V32, processes performed at the same steps are assigned reference numerals with the same last numbers and descriptions of such process in detail are omitted. Specifically, Steps V1 and V2 illustrated in FIG. 16 correspond to Steps S1 and S2 illustrated in FIG. 6.

Furthermore, Steps V4 to V102 illustrated in FIG. 16 correspond to Steps S3 to S92 illustrated in FIG. 6.

At Steps V31 and V32, by sending, after selecting a mobile station, a transmission announcement signal, i.e., a cooperation request, to each of the peripheral base stations 30 and 40, the serving base station 10 notifies, in advance, i.e., before the cooperation request transmission instruction signal is selected, that broadcast transmission is performed by the mobile station. After the completion of the notification, by sending a cooperation request transmission instruction signal to the mobile station 20, the serving base station 10 instructs the mobile station 20 to perform the broadcast transmission (Step V4). The process performed at Step V51 and the subsequent processes are the same as those performed at Step S41 and the subsequent processes in the first embodiment; therefore, the descriptions thereof will be omitted.

The wireless communication system 1 according to the fourth embodiment is preferable for use when, in particular, the peripheral base stations 30 and 40 do not obtain the schedule in which a mobile station intends to perform the broadcasting. Specifically, in the first embodiment, a description has been given with the assumption of the peripheral base stations that plan to receive the broadcasting from the mobile station. However, when the peripheral base stations 30 and 40 do not plan to receive the broadcasting from the mobile station, the serving base station 10 sends a notification, in advance, of the broadcasting. Specifically, before sending a cooperation request (broadcast) transmission instruction, the serving base station 10 notifies, in advance, each of the peripheral base stations 30 and 40 that the broadcasting is performed by the mobile station. Consequently, based on the advance notice from the serving base station 10 and based on the information included in this advance notice, the peripheral base stations 30 and 40 can perform, before receiving the broadcasting, the determination of the acceptance when the broadcasting is received and, furthermore, an advance preparation for the cooperation. Thus, even when the peripheral base stations 30 and 40 do not obtain the schedule of the broadcasting performed by the mobile station, the wireless communication system 1 can easily cope with this situation.

Furthermore, in the fourth embodiment, a description has been given of a case in which, as the information that is announced in advance by the serving base station 10 to the peripheral base stations 30 and 40, the broadcasting from a mobile station is scheduled; however the embodiment is not limited thereto. For example, when the peripheral base stations 30 and 40 do not obtain the procedure or the method of cooperating with the serving base station 10, the information indicating the procedure or the method or the information needed to perform the procedure or the method is sent as a notification. Furthermore, when the information that is sent as a notification is sent when a mobile station sends a broadcast signal, the peripheral base stations 30 and 40 can predict, in advance, the time at which the broadcast signal is received; monitor this state; and prepare for the determination of the acceptance of the mobile station based on the communication status. By receiving the information, based on the advance notice and the information that is included in this advance notice received from the serving base station 10, the peripheral base stations 30 and 40 can also previously determine whether the acceptance is possible when the broadcasting is received and, furthermore, can prepare for the cooperation. Consequently, even when the peripheral base stations 30 and 40 do not obtain sufficient information in advance, the wireless communication system 1 can easily cope with this situation.

In the embodiments described above, when the selection information on the plurality of peripheral base stations 30 and 40 indicates that the acceptance is "not possible", the serving base station 10 may also stop the cooperation with a peripheral base station. However, in accordance with the communication status of the peripheral base station that is not able to accept a mobile station, the serving base station 10 may also select a single or a plurality of peripheral base stations as a counterpart for the cooperation from among the peripheral base stations. For example, the serving base station 10 sets a threshold to each of the CQI, the propagation loss, and the free RB count. When at least two communication statuses are equal to or greater than the threshold or are less than the threshold, the serving base station 10 may also select the peripheral base station as the counterpart for the cooperation.

Specifically, it is assumed that the threshold of the CQI is set to "7", assumed that the threshold of the propagation loss is set to "80", and assumed that the threshold of the free RB count is set to "8". In such a case, for the peripheral base station 30 illustrated in FIG. 10, the CQI value of "5" is less than the threshold; however, the propagation loss of "75" is less than the threshold and the free RB count of "10" is equal to or greater than the threshold. Consequently, this satisfies the condition of the communication status. Thus, the serving base station 10 selects, as the counterpart for the cooperation, the peripheral base station 30 that indicated that the acceptance is not possible and then instructs the peripheral base station 30 to cooperate with the serving base station 10. By doing so, even when the resource shortage in the serving base station 10 is significant and thus the serving base station 10 is not able to accommodate the mobile station 20 by itself, the serving base station 10 can communicate with the mobile station 20 by cooperating with the peripheral base station 30, which is the other base station. Consequently, with the method described above, the wireless communication system 1 can more reliably eliminate the shortage of the resources due to an increase in the number of mobile stations. Thus, the flexibility of the wireless communication system 1 is improved.

In each of the embodiments, a description has been given of a case in which the mobile station 20 broadcasts a cooperation request signal; however, the transmission method is not limited to the broadcasting. For example, the multicasting may also be used. Specifically, the mobile station 20 does not always need to send, like broadcasting, a cooperation request signal to unspecified base stations. Instead, the mobile station 20 may also narrow down the destination base stations in advance and then send a cooperation request signal to a certain base station that satisfies a predetermined condition. The base station that satisfies the predetermined condition mentioned above is, for example, a base station in which each of the estimated values of the received radio wave intensity and the signal to interference ratio (SIR) is equal to or greater than a predetermined threshold, or a base station in which the distance from the mobile station 20 is equal to or less than a predetermined threshold. Consequently, the mobile station 20 previously excludes, from a candidate for the counterpart for the cooperation from among the peripheral base stations, the base station in which the quality of the communication status becomes low when communication is established. Thus, it is possible to omit the determining process that determines whether the acceptance is possible in the excluded peripheral base station and it is possible to reduce the processing load due to the process for selecting the counterpart for the cooperation performed in the serving base station 10.

Furthermore, in each of the embodiments, a description has been given with the assumption of mobile phones, smart phones, and personal digital assistants (PDAs) used as a mobile station; however, the present invention is not limited to the mobile stations. The present invention may also be used for various types of communication devices that are available for the broadcasting.

Furthermore, the components of each unit in the serving base station 10, the mobile station 20, the peripheral base stations 30 and 40 illustrated in FIG. 1 are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, the sending unit 12 and the receiving unit 13, the receiving unit 21 and the sending unit 23, or the receiving units 31 and 41 and the notifying units 33 and 43 may also be integrated as a single unit. In contrast, the base station selecting unit 11 in the serving base station 10 may also be separated by dividing it into a unit that determines whether cooperation is needed, into a unit that selects a mobile station, and into a unit that selects a base station as the counterpart for the cooperation. Furthermore, the acceptability determining units 32 and 42 in the peripheral base stations 30 and 40 may also be separated by dividing it into a unit that calculates the communication status, such as the CQI, the propagation loss, the free RB count, or the like, and into a unit that determines whether the acceptance of each mobile station is possible. Furthermore, the memories 10c and 20b may also be external devices of the serving base station 10 and the mobile station 20 and connected via a network or a cable.

In the above, a description has been individually given of the configuration and the operation for each embodiment; however, the wireless communication system according to each of the embodiments may integrally includes the units specified in the other embodiments. Furthermore, the combination of the embodiments is not limited to two. For example, any combination, such as three or more combinations, may also be used. Furthermore, for example, in the wireless communication system 1 according to the second embodiment, similarly to the third embodiment, the sending unit 23 in the mobile station 20 may also send, to the serving base station 10, a signal that requests the mobile station 20 to broadcast a cooperation request signal. Furthermore, the wireless communication system 1 according to the third embodiment, similarly to the fourth embodiment, the sending unit 12 in the serving base station 10 may have a function of sending, to the peripheral base stations 30 and 40 in advance, a signal as a notification indicating that the broadcasting will be performed by the mobile station 20. Furthermore, a single wireless communication system may integrally have all of the units described in the first to the fourth embodiments.

According to an aspect of an embodiment of the wireless communication system, an advantage is provided in that a base station can accurately select another base station that is suitable for cooperation.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
a plurality of base stations; and
a mobile station that communicates with a first base station that is included in the plurality of base stations, wherein
the first base station includes
a first sending unit that sends, to the mobile station, a signal that indicates that communication is going to be performed in cooperation with the plurality of base stations,
the mobile station includes
a second sending unit that broadcasts, to the plurality of base stations in accordance with reception of the signal, a predetermined request signal, and
one or more second base stations, which have received the predetermined request signal and are from among the plurality of base stations, each include
a notifying unit that notifies the first base station of selection information that is information based on the predetermined request signal and is information on a base station, from among the plurality of base stations, that is going to communicate with the mobile station in cooperation with the first base station, wherein
each of the second base stations further includes an acceptability determining unit that calculates, when a cooperation request signal is received, a free resource block (RB) count in a respective base station of the second base stations obtained when resources are allocated to the mobile station, determines, based on the calculation result, whether reception quality of the mobile station can be maintained even when the mobile station is connected, and determines whether the mobile station can be accepted, based on the determination result and communication quality of all of the mobile stations that are already connected to each of the second base stations.

2. The wireless communication system according to claim 1, wherein the selection information is information that is used by the first base station to select, from among the plurality of base stations, the base station that is going to communicate with the mobile station in cooperation with the first base station.

3. The wireless communication system according to claim 1, wherein the selection information is information that indicates the base station that is going to communicate with the mobile station in cooperation with the first base station.

4. The wireless communication system according to claim 1, wherein the second sending unit in the mobile station sends, to the first base station, a signal that requests the mobile station to broadcast the predetermined request signal.

5. The wireless communication system according to claim 1, wherein the first sending unit in the first base station sends, to the one or more second base stations before the signal that indicates that the communication is going to be performed is sent, a signal as a notification indicating that broadcasting is going to be performed by the mobile station.

6. A mobile station, in a wireless communication system that includes a plurality of base stations, that communicates with a first base station that is included in the plurality of base stations, the mobile station comprising:
a receiving unit that receives a signal that is sent from the first base station and that indicates that communication with the mobile station is going to be performed in cooperation with the plurality of base stations; and
a sending unit that broadcasts, to the plurality of base stations in accordance with reception of the signal, a predetermined request signal that is used to create selection information on a base station, from among the plurality of base stations, that is going to communicate with the mobile station in cooperation with the first base station, wherein each of second base stations includes an acceptability determining unit that calculates, when a cooperation request signal is received, a free resource block (RB) count in a respective base station of the second base stations obtained when resources are allocated to the mobile station, determines, based on the calculation result, whether reception quality of the mobile station can be maintained even when the mobile station is connected, and determines whether the mobile station can be accepted, based on the determination result and communication quality of all of the mobile stations that are already connected to each of the second base stations.

7. A base station, in a wireless communication system that includes a plurality of base stations, that communicates with a mobile station, the base station comprising:

a sending unit that sends, to the mobile station, a signal that indicates that communication is going to be performed in cooperation with the plurality of base stations; and a receiving unit that receives, from one or more second base stations that are from among the plurality of base stations and that have received a predetermined request signal that is broadcast by the mobile station in accordance with the reception of the signal, selection information on one of the base stations, from among the plurality of base stations, that is going to communicate with the mobile station in cooperation with the base station, wherein each of the second base stations includes an acceptability determining unit that calculates, when a cooperation request signal is received, a free resource block (RB) count in a respective base station of the second base stations obtained when resources are allocated to the mobile station, determines, based on the calculation result, whether reception quality of the mobile station can be maintained even when the mobile station is connected, and determines whether the mobile station can be accepted, based on the determination result and communication quality of all of the mobile stations that are already connected to each of the second base stations.

8. A base station, in a wireless communication system that includes a plurality of base stations and a mobile station, the base station comprising:

a receiving unit that receives a predetermined request signal that is broadcast by the mobile station, which communicates with another base station; and a notifying unit that notifies the other base station of selection information that is information based on the predetermined request signal and is information on a base station, from among the plurality of base stations, that is going to communicate with the mobile station in cooperation with the other base station, wherein each of second base stations includes an acceptability determining unit that calculates, when a cooperation request signal is received, a free resource block (RB) count in a respective base station of the second base stations obtained when resources are allocated to the mobile station, determines, based on the calculation result, whether reception quality of the mobile station can be maintained even when the mobile station is connected, and determines whether the mobile station can be accepted, based on the determination result and communication quality of all of the mobile stations that are already connected to each of the second base stations.

9. A communication method in a wireless communication system that includes a plurality of base stations and a mobile station that communicates with a first base station that is included in the plurality of base stations, the communication method comprising:

sending, to the mobile station, a signal that indicates that communication is going to be performed in cooperation with the plurality of base stations, by the first base station;

broadcasting, to the plurality of base stations in accordance with reception of the signal, a predetermined request signal, by the mobile station;

notifying the first base station of selection information that is information based on the predetermined request signal and is information on a base station, from among the plurality of base stations, that is going to communicate with the mobile station in cooperation with the first base station, by each of one or more second base stations that are from among the plurality of base stations and that have received the predetermined request signal; and by each of the second base stations, calculating, when a cooperation request signal is received, a free resource block (RB) count in a respective base station of the second base stations obtained when resources are allocated to the mobile station, determining, based on the calculation result, whether reception quality of the mobile station can be maintained even when the mobile station is connected, and determining whether the mobile station can be accepted, based on the determination result and communication quality of all of the mobile stations that are already connected to each of the second base stations.

10. A communication method, in a wireless communication system that includes a plurality of base stations, performed by a mobile station that communicates with a first base station that is included in the plurality of base stations, the communication method comprising:

receiving a signal that is sent from the first base station and that indicates that communication is going to be performed with the mobile station in cooperation with the plurality of base stations;

broadcasting, to the plurality of base stations in accordance with the reception of the signal, a predetermined request signal that is used to create selection information on a base station, from among the plurality of base stations, that is going to communicate with the mobile station in cooperation with the first base station; and by each of second base stations, calculating, when a cooperation request signal is received, a free resource block (RB) count in a respective base station of the second base stations obtained when resources are allocated to the mobile station, determining, based on the calculation result, whether reception quality of the mobile station can be maintained even when the mobile station is connected, and determining whether the mobile station can be accepted, based on the determination result and communication quality of all of the mobile stations that are already connected to each of the second base stations.

11. A communication method, in a wireless communication system that includes a plurality of base stations, performed by a base station that communicates with a mobile station, the communication method comprising:

sending, to the mobile station, a signal that indicates that communication is going to be performed in cooperation with the plurality of base stations;

receiving, from one or more second base stations that are from among the plurality of base stations and that have received a predetermined request signal that is broadcast by the mobile station in accordance with the reception of the signal, selection information on a base station that is going to communicate with the mobile station in cooperation with the base station from among the plurality of base stations; and by each of the second base stations, calculating, when a cooperation request signal is received, a free resource block (RB) count in a respective base station of the second base stations obtained when resources are allocated to the mobile station, determining, based on the calculation result, whether reception quality of the mobile station can be maintained even when the mobile station is connected, and determining whether the mobile station can be accepted, based on the determination result and communication quality of all of the mobile stations that are already connected to each of the second base stations.

12. A communication method, in a wireless communication system that includes a plurality of base stations and a mobile station, performed by a base station, the communication method comprising:

receiving a predetermined request signal that is broadcast by the mobile station, which communicates with another base station;

notifying the other base station of selection information that is information based on the predetermined request signal and is information on one of the base stations, from among the plurality of base stations, that is going to communicate with the mobile station in cooperation with the other base station; and by each of second base stations, calculating, when a cooperation request signal is received, a free resource block (RB) count in a respective base station of the second base stations obtained when resources are allocated to the mobile station, determining, based on the calculation result, whether reception quality of the mobile station can be maintained even when the mobile station is connected, and determining whether the mobile station can be accepted, based on the determination result and communication quality of all of the mobile stations that are already connected to each of the second base stations.

\* \* \* \* \*